April 28, 1936.  W. McQUADE  2,038,801
METHOD OF MAKING A STRUCTURAL UNIT
Filed Jan. 15, 1935
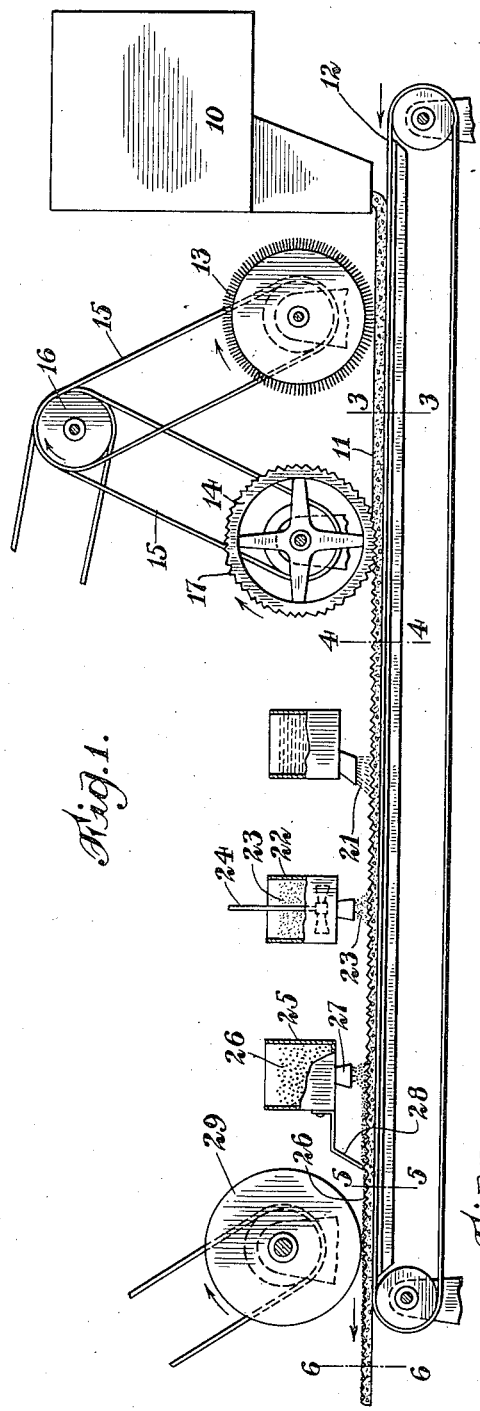
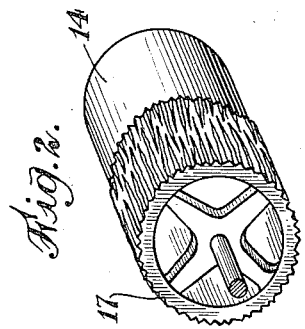
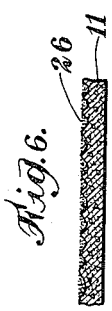
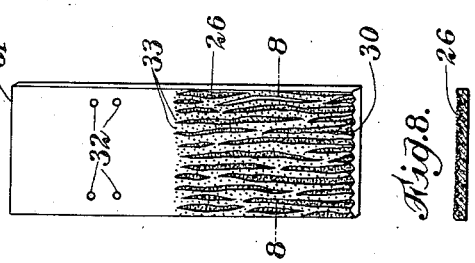
INVENTOR.
Walter McQuade.
BY D. N. Halstead
ATTORNEY.

Patented Apr. 28, 1936

2,038,801

UNITED STATES PATENT OFFICE 2,038,801

METHOD OF MAKING A STRUCTURAL UNIT

Walter McQuade, Port Washington, N. Y., assignor to Johns-Manville Corporation, New York, N. Y., a corporation of New York Application January 15, 1935, Serial No. 1,875

4 Claims. (Cl. 18—48)

This invention relates to the method of making a unit of structural material with veined surface, and particularly to a rigid shingle provided with veins of color that is different from that of the matrix. The invention pertains especially to the method of making shingles from a composition that is plastic or readily deformable at one stage of the process of manufacturing the shingles.

This application is a continuation in part of my application for United States patent, Serial No. 609,851, filed May 7, 1932 which has become Patent 2,015,084.

The method of the present invention includes providing depressions, suitably elongated indentations or corrugations in the surface of a sheet containing a mixture of fibers and hydraulic cementitious material, for example, while the mixture is in readily deformable state, filling the depressions, in part at least, with particles such as granular slate of selected color, and then densifying and hardening the material.

Rigid shingles prepared from a mixture of Portland cement and asbestos fibers, either in presses or in machines of a type and by a process similar to that described in U. S. Patent 979,548 to Norton, dated December 27, 1910, are illustrative of the products and materials to which this invention has been successfully applied, and the invention is specifically described hereinafter with reference to such products. Such shingles may contain various proportions of Portland cement to short asbestos fibers, as, for example, 1.7 to 2.2, suitably 1.9 parts by weight of the cement to 1 part of asbestos. Also, the shingles may contain admixed coloring material, such as lamp black, and/or a veneer of coloring materials, such as pigments, adhered to a face of the shingle by means of a cementitious material. Thus, a veneer of Portland cement and burnt umber, chrome green, yellow oxide, and/or the like, may be applied to the top surface of a part or all of the band or sheet of the mixture of the other shingle ingredients and firmly adhered to the said band or sheet, as by subsequent pressing and hardening operations. The veneer may establish a uniform color over the part of the sheet to which the veneer is applied.

My improved products, as well as the method of producing them, are illustrated in the accompanying drawing in which Fig. 1 shows diagrammatically an assembly of an apparatus suitable for use in the manufacture of the products.

Fig. 2 is a perspective view of a rotary die provided with a molding surface adapted to produce depressions in the surface of a readily deformable mixture.

Figs. 3 to 6 inclusive are end views of segments of the sheet material as it travels along the conveyor and illustrate the condition of the sheet obtaining at the stages indicated by the several lines 3—3, 4—4, 5—5, and 6—6 of Fig. 1.

Figs. 7 and 8 are a perspective and a sectional view on line 8—8, of Fig. 7, respectively, of a shingle made in accordance with the invention.

In the device shown in Fig. 1, a hopper 10 is provided for feeding a dry mixture of a suitable hydraulic cementitious material, such as Portland cement, and a reenforcing fibrous material, such as asbestos, onto a continuously advancing conveyor 12. A picker roll 13 of a conventional type serves to brush off excess material and leaves the sheet or band 11, comprising the mixture of cementitious and fibrous material, emerging therefrom of selected thickness and plane surfaces, as indicated in Fig. 3. The sheet at this stage is readily deformable. It passes between side guides (not shown) to true up the edges. The sheet is next subjected to the action of the rotary die 14 provided with a molding surface 17 which impresses the desired depressions, suitably elongated, irregular indentations, on the sheet and, at the same time, slightly compresses the material and makes it more dense below the depressions than below the elevations. Die 14, shown in detail in Fig. 2, is specially adapted for the production of shingles such as illustrated in Figs. 7 and 8, wherein the irregularities of appearance of the surface are confined to the portion of the shingle exposed to view when laid in a finished structural assembly, such as a roof. The pattern illustrated imparts to the shingle a grooved surface. The grooves may be arranged in a pattern similar to that of the grains in wooden shingles or timbers. Also, the shingle may be colored, by conventional means, as will appear later, with materials that impart a color resembling weathered wood to the surface of the shingle that is to be exposed in a structural assembly.

Die 14 and picker roll 13 are rotated by any usual means, such as belts 15 from pulley 16.

The sheet next passes under a water spray 21 of the usual type for applying sufficient water to the sheet to hydrate the cement, the water thus applied being quickly absorbed in the porous mass.

The wet sheet provided with grooves or indentations then passes under a vessel 22 containing a colored veneer composition 23, suitably kept suspended in water by an agitator 24 driven by convenient means. The veneer may be applied only to the portion of the sheet that is to constitute the portion of shingles exposed to view when placed in an assembly, such as a roof. The veneer may contain the usual shingle veneer ingredients, such as Portland cement and pigments and/or dyes.

The sheet passes next under a vessel 25 containing colored particles 26, such as granular tile or slate, and provided with a hopper or sieve 27, for feeding the particles onto the sheet. The particles fall largely into the depressions, in closer proximity to each other there than in the intervening areas between the depressions.

The feed of the colored particles from the hopper may be produced by vibrating the container 25 or by other conventional means. Apron 28 serves to level off the particles in such manner that they fill the depressions, at least in part, and, suitably, substantially completely. Those left on the elevations and that are not removed therefrom in subsequent operations remain as intermediate particles 33 in the finished shingle. These intermediate particles, in spaced relationship to each other and in positions between the veins, are useful in adding to the general color scheme.

The sheet with the surface thus treated next passes under a compression roll 29 which partially compacts the sheet and pushes into the depressions some of the colored particles that may still remain lodged on the high spots of the sheet.

Both compression roll 29 and die 14 may be arranged with their axes at a slight angle with respect to the plane of the conveyor 12, so that sheet 11 is thereby tapered in a transverse direction, the thick butt portion coinciding with the ornamented surface, as indicated in Fig. 7.

The sheet is then severed by crosswise cutting into segments, which are usually somewhat larger than the size desired for the finished shingle. The segments are stacked in piles with a flat metal plate of plane surface between adjacent segments and subjected to strong compression in a hydraulic press, as, for example, to 14,000 pounds pressure per square inch. This pressure densifies the segments, flattens irregularities of both faces to give plane surfaces, and forces cementitious material into the spaces between the colored particles in the grooves, so that the particles of colored filling material become embedded in the cementitious composition. The densified segments are removed from the press and are permitted to stand until the cement is thoroughly hardened, the metal plates being removed after the cement has taken an initial set. These operations are not shown, since they are conventional in the manufacture of shingles of the rigid asbestos type. The segments thus formed are ordinarily somewhat wider than the width of two shingles and are finally divided and trimmed to size, to produce individual shingles such as illustrated in Figs. 7 and 8, say, of size 17 x 12, 17 x 7, or 17 x 5 inches, of thickness approximately one-fourth inch at the butt end 30 and one-eighth inch at the thin end 31. Perforations 32 are provided, as by punching in conventional manner, for use as nail holes in assembling the shingles in a roof structure.

The products of the present invention have a number of interesting features in addition to those that have been already mentioned. They contain colored particles that are permanently secured in the hardened cementitious composition and are more concentrated in certain elongated areas than in other parts of the unit, to give the architecturally pleasing effect of veins in an otherwise smooth or plane surface. This effect is obtained without such lessening of strength as would be produced, for example, by scoring a shingle to create the appearance of irregularity of surface. The colored particles or flakes are thoroughly imbedded in the veins, due to the inflow of the plastic composition or matrix material between the particles, during the densifying operation. The veins may be provided in various arrangements and shapes. They may be more or less regular or highly irregular, to suit the needs of a given structure. They may be of substantial and variable width and depth. Thus, veins about one-eighth inch wide and one-eighth inch or slightly less in greatest depth or thickness have been used. The veins are preferably substantially less in width than the width of the intervening areas of plane surface, as illustrated. The veins detract from the conspicuousness of undesired variations in the matrix, such as differences of color. Although grained more or less like wood, for example, the shingles are incombustible and resistant to the atmosphere. The veins of granular material, denoted by 26 in Figs. 6 and 7, contain spaces between the granules and are adapted, therefore, to facilitate drainage of water falling upon the shingle. In a roof comprising overlapping shingles it is desirable to minimize the flow of rain water from the side edge of one shingle onto the underlying shingle, inasmuch as water flowing over the edge of a shingle may reach the joint in the underlying course of shingles. Since the veins extend in the general direction of the longer dimension of the shingle, these veins in shingles on a roof tend to facilitate drainage in the desired manner, that is, toward the lower end of the shingle. Furthermore, as will be seen particularly from Fig. 8, the asbestos-cement composition that establishes the form and gives strength to the structure is substantially thicker in a plurality of areas than in the alternating areas, to form depressions in which the colored material is concentrated. At the same time, the colored granules partly fill the depressions and maintain a substantially plane upper surface of the unit.

While the invention has been described with particular reference to the provision of veins of colored material in shingles known commercially as rigid asbestos shingles, the invention is applicable generally to the provision of such veins in materials, such as structural units, which are readily deformable at one stage of their manufacture and are subsequently hardened.

The details that have been given are for the purpose of illustration and not restriction of the invention. It is intended, therefore, that variations within the spirit of the invention should be included within the scope of the claims.

What I claim is:

1. In making a rigid structural unit of the type of a veined shingle, the method which comprises providing a deformable sheet of substantially plane upper surface and of composition adapted to be hardened, forming in the said sheet elongated depressions alternating with intervening areas of substantially plane surface, disposing granular filling material in the said depressions, subjecting the product to strong compression to cause the filling material to become embedded in the said composition, and then hardening the composition, whereby the filling material is permanently secured thereto.

2. In making a structural unit of the type of a veined shingle, the method which comprises providing a plastic deformable sheet of substantially plane upper surface and of composition including a hydraulic cementitious material, reenforcing fibres, and water, forming in the said sheet elongated depressions alternating with intervening areas of substantially plane surface, disposing granular filling material in the said depressions, subjecting the product to strong compression to cause the filling material to become embedded in the said composition, and then causing the cementitious material to harden, whereby the filling material is permanently secured thereto.

3. In making a structural unit of the type of a veined shingle, the method which comprises providing a deformable sheet of substantially plane upper surface of a composition including a hydraulic cementitious material, reenforcing fibres, and water, forming in the said sheet elongated depressions alternating with intervening areas of substantially plane surfaces, disposing granular filling material in the said depressions, and compressing and hardening the resulting product to embed and permanently secure the filling material in the cementitious composition.

4. In making a structural unit of the type of a shingle, the method which comprises providing a deformable sheet including a hydraulic cementitious material, reenforcing fibres, and water, forming in the said sheet elongated depressions alternating with intervening areas, disposing granules of filling material over the surface of the sheet in closer proximity to each other in the said depressions than over the said intervening areas, and compressing and hardening the resulting product, whereby the filling material is embedded in and permanently secured in the cementitious composition.

WALTER McQUADE.